US008688308B2

(12) United States Patent
Wu et al.

(10) Patent No.: US 8,688,308 B2
(45) Date of Patent: Apr. 1, 2014

(54) METHOD AND SYSTEM FOR NAVIGATION OF MOVABLE PLATFORM

(71) Applicant: Industrial Technology Research Institute, Hsinchu (TW)

(72) Inventors: Chien-Feng Wu, Taichung (TW); Yan-Chen Liu, Taipei (TW); Tsung-Liang Wu, Hsinchu County (TW); Chun-Chieh Wang, Hsinchu (TW); Yu-Liang Chung, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/682,638

(22) Filed: Nov. 20, 2012

(65) Prior Publication Data

US 2013/0158775 A1 Jun. 20, 2013

(30) Foreign Application Priority Data

Dec. 29, 2011 (TW) .............................. 100149457 A

(51) Int. Cl.
*G01C 3/00* (2006.01)
(52) U.S. Cl.
USPC ............................................ 701/28; 701/412
(58) Field of Classification Search
USPC ................................................... 701/28, 412
See application file for complete search history.

(56) References Cited

U.S. PATENT DOCUMENTS 5,341,540 A 8/1994 Soupert et al.
5,995,884 A * 11/1999 Allen et al. ..................... 701/24

6,259,403 B1 7/2001 Nichols
6,417,641 B2 7/2002 Peless et al.
6,984,952 B2 1/2006 Peless et al.
7,228,230 B2 6/2007 Hirokawa
7,840,352 B2 11/2010 Strelow et al.
7,983,808 B2 7/2011 Bauer
2006/0012777 A1 1/2006 Talbot et al.

FOREIGN PATENT DOCUMENTS

TW M348676 1/2009

OTHER PUBLICATIONS

Rudiger Marmulla et al., "Laser-Scan-Based Navigation in Cranio-Maxillofacial Surgery," Journal of Cranio-Maxillofacial Surgery, Oct. 2003, pp. 267-277, vol. 31, EU.
R. Marmulla et al., "Inherent Precision of Mechanical, Infrared and Laser-Guided Navigation Systems for Computer-Assited Surgery," Journal of Cranio-Maxillofacial Surgery, Aug. 1997, pp. 192-197, vol. 25, EU.

(Continued)

*Primary Examiner* — Mary Cheung
*Assistant Examiner* — Yuen Wong

(57) ABSTRACT

A method for navigation of a movable platform is provided. The method includes the steps. First, a plurality of reflection devices is placed to mark a range. A coordinate location and a direction of the movable platform are received by a positioning system. At least one laser to measure relative positions and distances between the reflection devices and the movable platform are emitted by a laser range finder, respectively. Absolute locations of the reflection devices and the range are calculated by a processor according to the coordinate location and the direction of the movable platform, the relative positions and the distances between the reflection devices and the movable platform. The reflection devices are scanned and tracked by the processor, and the coordinate location and the direction of the movable platform and the absolute locations are calibrated by the processor to control the movable platform to move in the range.

12 Claims, 6 Drawing Sheets

(56) References Cited

OTHER PUBLICATIONS

Ali Siadat et al., "An Optimized Segmentation Method for a 2D Laser-Scanner Applied to Mobile Robot Navigation," downloaded from citeseerx.ist.psu.edu, 6 pages, 1997.

Jose Guivant et al., "Autonomous Navigation and Map Building Using Laser Range Sensors in Outdoor Applications," Journal of Robotic Systems, Oct. 2000, pp. 565-583, vol. 17, No. 10, US.

* cited by examiner

METHOD AND SYSTEM FOR NAVIGATION OF MOVABLE PLATFORM

CROSS REFERENCE TO RELATED APPLICATIONS

The present application is based on, and claims priority from, Taiwan (International) Application Serial Number 100149457, filed on Dec. 29, 2011, the disclosure of which is hereby incorporated by reference herein in its entirety.

TECHNICAL FIELD

The present disclosure relates to a system and method for navigation, and in particular relates to a system and method for navigation of a movable platform.

BACKGROUND

With the development of science and technology, service robots have gradually replaced many of the traditional human labor workforces. A variety of robots used in an indoor or outdoor environment have been widely available, such as in Europe and the United States. For current outdoor mobile platforms with a high-precision navigation system, one of the most important applications is an outdoor service robot. According to market research data and statistical data (Robot Home Cleaning, Cooking, Pool Cleaning, and Lawn Mowing Market Strategy, Market Shares, and Market Forecasts, 2008-2014), such as that analyzed by Wolfram Research, Inc, the technology of current outdoor service robots is still immature, but has a large potential market, such as that for a robot that mows, wherein the market size is expected to grow and reach US $305 billion in 2014.

The outdoor mobile platform is mainly used for working in large outdoor areas. For many occasions and in many environments, for example, golf courses, parks, and yards in front of or behind a house and so on, the outdoor mobile platform is a useful product. A navigation system is the most important and critical component of the outdoor mobile platform. The navigation system can also determine whether the work efficiency of the mobile platform is good or bad. However, the navigation technology of current outdoor mobile platforms has limitations.

SUMMARY

A detailed description is given in the following embodiments with reference to the accompanying drawings.

Methods and systems for navigation of a movable platform are provided.

In one exemplary embodiment, the disclosure is directed to a method for navigation of a movable platform. The method is used in a system. The system includes a plurality of reflection devices and a movable platform, wherein the movable platform further includes a positioning system, a laser range finder and a processor. The method comprises: placing the plurality of reflection devices to mark a range; receiving, by the positioning system, a coordinate location and a direction of the movable platform; emitting, by the laser range finder, at least one laser to measure relative positions and distances between the plurality of reflection devices and the movable platform, respectively; calculating, by the processor, absolute locations of the plurality of reflection devices and the range according to the coordinate location and the direction of the movable platform, and the relative position and the distances between the plurality of reflection devices and the movable platform; and scanning and tracking, by the laser range finder, the plurality of reflection devices, and calibrating, by the processor, the coordinate location and the direction of the movable platform and the absolute locations of the plurality of reflection devices to control the movable platform to move in the range.

In one exemplary embodiment, the disclosure is directed to a system for navigation of a movable platform. The system comprises a plurality of reflection devices, a movable platform. The plurality of reflection devices is configured to mark a range. The movable platform is configured to move in the range, wherein the movable platform further includes a positioning system, a laser range finder and a processor. The positioning system is configured to position a coordinate location and a direction of the movable platform. The laser range finder is configured to emit at least one laser to measure relative positions and distances between the plurality of reflection devices and the movable platform, respectively. The processor coupled to the positioning system and the laser range finder is configured to calculate absolute locations of the plurality of reflection devices and the range according to the coordinate location and the direction of the movable platform, and the relative position and the distances between the plurality of reflection devices and the movable platform, wherein the movable platform scans and tracks the plurality of reflection devices by using the laser range finder, and calibrates the coordinate location and the direction of the movable platform and the absolute locations of the plurality of reflection devices to control the movable platform to move in the range.

DRAWINGS

The present disclosure can be more fully understood by reading the subsequent detailed description and examples with references made to the accompanying drawings, wherein.

DETAILED DESCRIPTION

Figure 1:
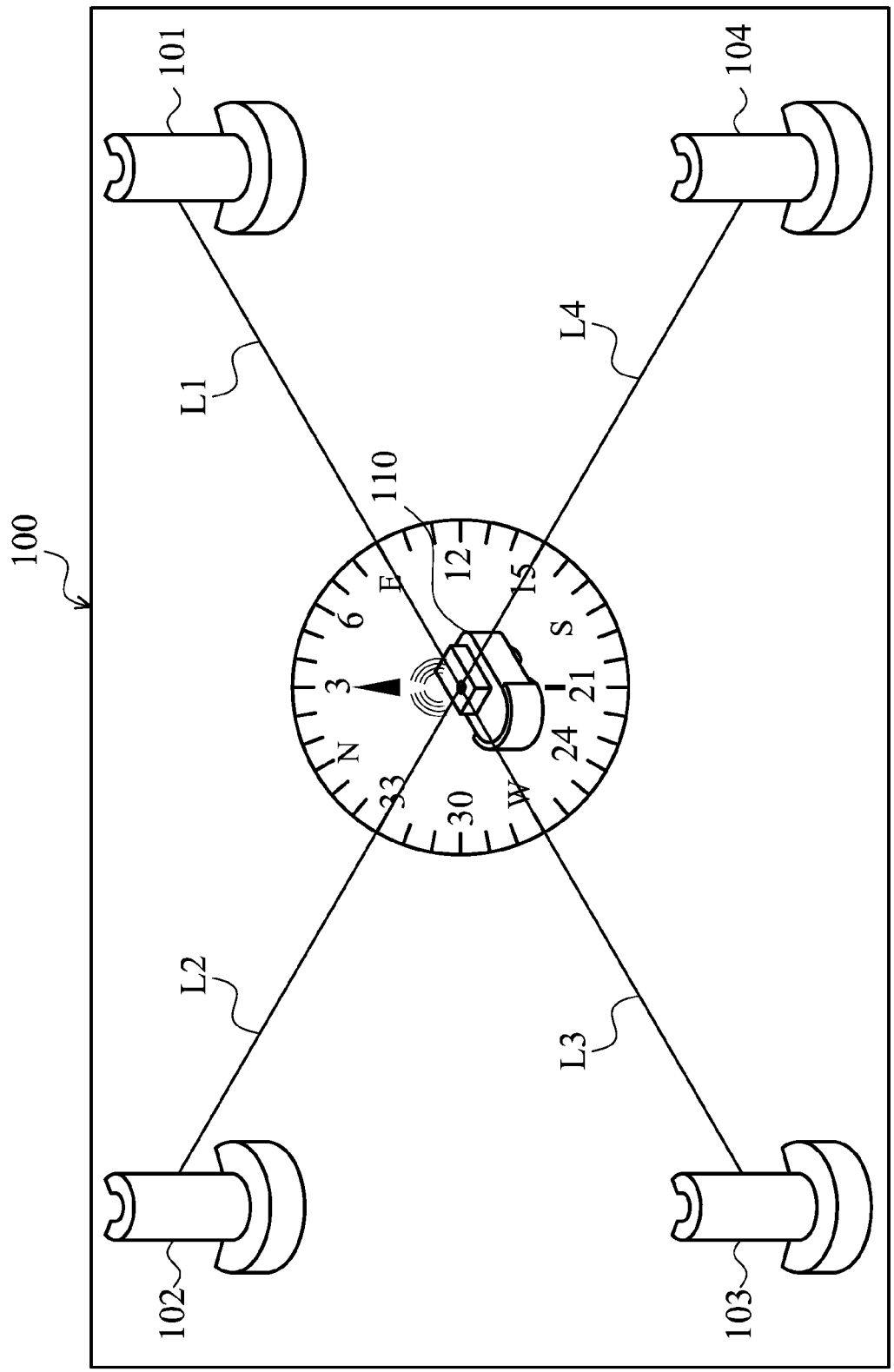
FIG. 1 is an architecture diagram of a system for navigation of a movable platform according to an embodiment of the present disclosure.

Several exemplary embodiments of the application are described with reference to FIGS. 1 through 5, which generally relate to navigation of a movable platform. It is to be understood that the following disclosure provides various different embodiments as examples for implementing different features of the application. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

Embodiments described below illustrate methods and systems for navigation of a movable platform of the present disclosure.

FIG. 1 is an architecture diagram of a system 100 for navigation of a movable platform according to an embodiment of the present disclosure.

Referring to FIG. 1, the system 100 for navigation of a movable platform comprises a plurality of reflection devices 101~104 and a mobile platform 110. The reflection devices 101~104 can be placed on the outside to mark a work range. In one embodiment, reflection devices 101~104 are reflection columns or reflection marks. The mobile platform 110 moves within the work range.

Figure 2:
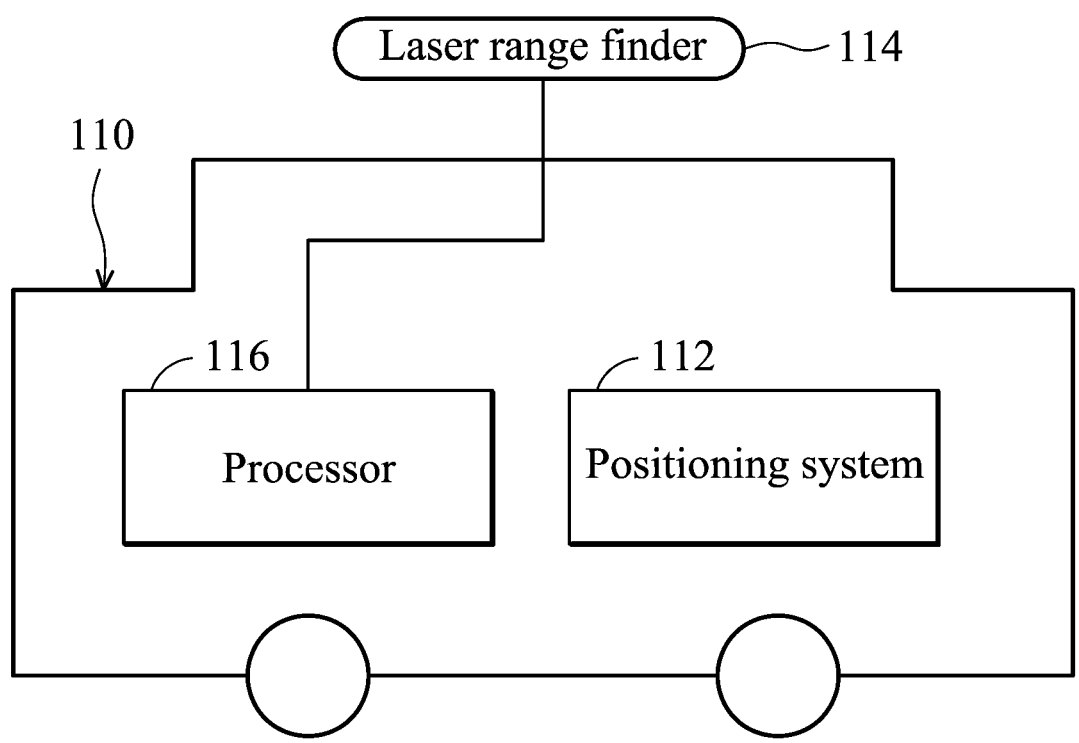
FIG. 2 is a schematic diagram illustrating the mobile platform according to an embodiment of the present disclosure.

FIG. 2 is a schematic diagram illustrating the mobile platform 110 according to an embodiment of the present disclosure. The movable platform 110 comprises a positioning system 112, a laser range finder 114 and a processor 116. The positioning system 112 and the laser range finder 114 are coupled to the processor 116. The positioning system is a global positioning system (GPS), a GLObal NAvigation Satellite System (GLONASS), a Galileo and a satellite based augmentation system (SBAS) and so on. In one embodiment, the distance between any two of the plurality of reflection devices 101~104 is greater than a positioning error of the positioning system.

In another embodiment, the laser range finder 114 is installed above the mobile platform 110 via a rotating platform, and the laser range finder 114 can rotate 360 degrees.

In another embodiment, the laser range finder 114 can be used to measure the laser in an outdoor open environment, and a laser emitted by the laser range finder 114 can be only reflected by specific reflecting materials.

Figure 3A:
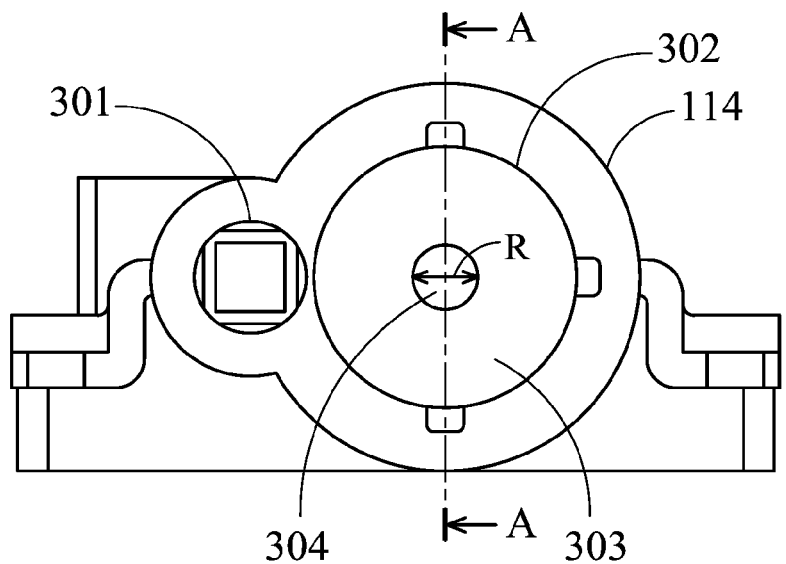
FIG. 3A is a side diagram of the laser range finder according to an embodiment of the present disclosure.
Figure 3B:
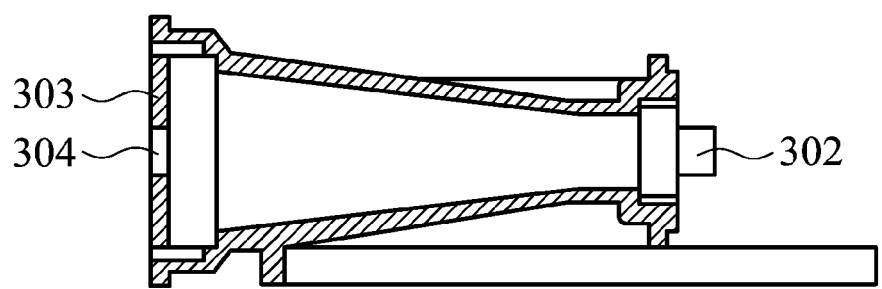
FIG. 3B is a cross-sectional diagram of the laser range finder according to an embodiment of the present disclosure.

Referring to FIG. 3A and FIG. 3B, FIG. 3A is a side diagram of the laser range finder 114 according to an embodiment of the present disclosure. FIG. 3B is a cross-sectional diagram of the laser range finder 114 according to an embodiment of the present disclosure, wherein FIG. 3B is the cross-sectional diagram taken along line A-A of the laser range finder 114 in FIG. 3A. In FIG. 3A, the laser range finder 114 comprises a laser-emitting source 301, a receiver 302 and a shield plate 303. A receiving hole 304 is formed through the shield plate 303. Because the noise of the outdoor light is too large, it is difficult for the laser range finder in the prior art to measure the distance. Therefore, the shield plate with the receiving hole is added to the original receiver in the embodiment, so that the laser range finder 114 can receive the laser reflected by a specific reflecting material to reduce influence of the outdoor light. As shown in FIG. 3A, the diameter of the receiving hole 304 is between 0.5~15 mm. In FIG. 3B, similar or corresponding elements are assigned the same labels, and the characteristics described above will be omitted in the following instructions.

In addition, the specific reflective material is for attachment to the surface of the reflection devices 101~104. Because a known reflection rate of the specific reflective material is adopted, a sensing range that the laser range finder receives the laser can be set in advance, so that the laser range finder can recognize the laser reflected by the specific reflecting material. In one embodiment, the reflection rate of the specific reflective material is greater than 60%, for the specific reflective material to scatter the incident light. It should be noted that the receiving hole diameter of the laser range finder is related to the reflection rate of the specific reflecting material. When the reflection rate of the specific reflective material is higher, the receiving hole diameter of the laser range finder can be smaller. In addition, the reflection devices are the reflecting objects with the specific reflecting material. In a preferred embodiment, the wavelength of the laser emitted by the laser range finder is 650 nm, and the reflective material is a 3M™ series 6500 High Gloss Sparkle Film. The diameter R of the receiving hole is almost 2 millimeters (mm) according to the design of the wavelength of the laser and the reflective material. It should be understood for a person of ordinary skill in the art that the disclosure is not limited, and the reflection devices can be any shape.

As shown in FIG. 1 and FIG. 2, the user places the plurality of reflection devices 101~104 to mark a range, and puts the movable platform 110 in the range. First, the mobile platform 110 moves around the small area within the positioning error, and the positioning system 112 receives a current coordinate location and a current direction of the movable platform 110, wherein the coordinate location can be, for example, a location in degrees of latitude and longitude. In one embodiment, the positioning system is the global positioning system (GPS), and the positioning error of the positioning system is 3 meters.

The laser range finder emits at least one laser to search all the reflection devices 101~104, and measures the distances L1~L4 between the reflection devices 101~104 and the movable platform 110, respectively. The processor 116 calculates and records absolute locations of the reflection devices 101~104 and the range according to the coordinate location of the movable platform 110 and the distances L1~L4 between the reflection devices 101~104 and the movable platform 110. The processor 116 further determines whether the distance between any two of the reflection devices 101~104 is greater than the positioning error. When the distance between any two of the reflection devices 101~104 is smaller than or equal to the positioning error, the processor 116 sends a signal to inform the user to replace the reflection devices.

After calculating the absolute locations of the reflection devices 101~104 and the range, the mobile platform 110 can start operation in the range, and emit the laser and change the emitting degree of the laser through the laser range finder 114 to lock a first reflection device 101 which is closest to the movable platform 110. It is worth noting that when the mobile platform 110 moves or rotates, the laser range finder 114 can rotate in any direction. For example, the laser range finder 114 maintains locking a reflection device which is closest to the movable platform 110 via the rotation of the mobile platform 110.

Figure 4:
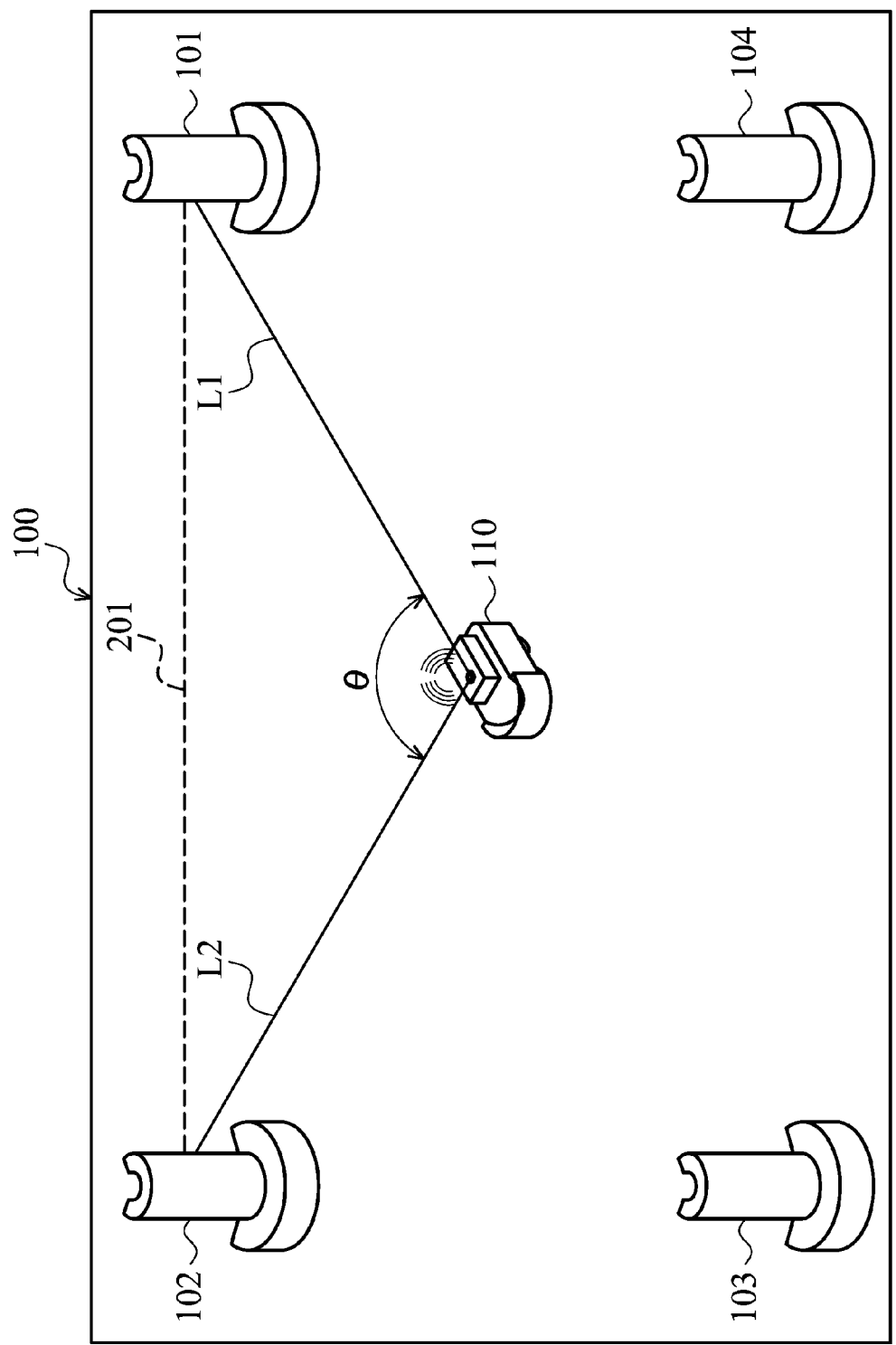
FIG. 4 is a schematic diagram illustrating how the mobile platform according to an embodiment of the present disclosure.

When the laser range finder 114 locks the first reflection device 101, the processor 116 continues to calibrate the current coordinate location of the mobile platform 110, and determines whether the mobile platform 110 is close to a boundary of the range. As shown in FIG. 4, when the mobile platform 110 is close to a boundary 201 of the range, the laser range finder 114 finds a second reflection device 102 which is closest to the movable platform 110 except the first reflection device 101, and the processor 116 obtains an angle θ between a line from the mobile platform 110 to the first reflection device 101 and a line from the mobile platform 110 to the second reflection device 102. The laser range finder 114 continues to emit the laser between the first reflection device 101 and the second reflection device 102. When the angle θ reaches 180 degrees, the processor 116 controls the mobile platform 110 to rotate in another direction to avoid exceeding the boundary 201 of the range.

In some embodiments, when the distance between the mobile platform 110 and the reflection device which is closest to the movable platform 110 is too far or the mobile platform 110 can not keep tracking of the reflection device which is closest to the movable platform 110 due to topography factors, the processor 116 controls the laser range finder 114 to find another one reflection device which is closest to the movable platform 110. In another embodiment, when the mobile platform 110 finds another reflection device which is closer to the current location of the mobile platform 110 according to the absolute location of each reflection device recorded by the processor 116 previously, the processor 116 controls the laser range finder 114 to find the reflection device which is closest to the mobile platform 110 currently.

Figure 5A:
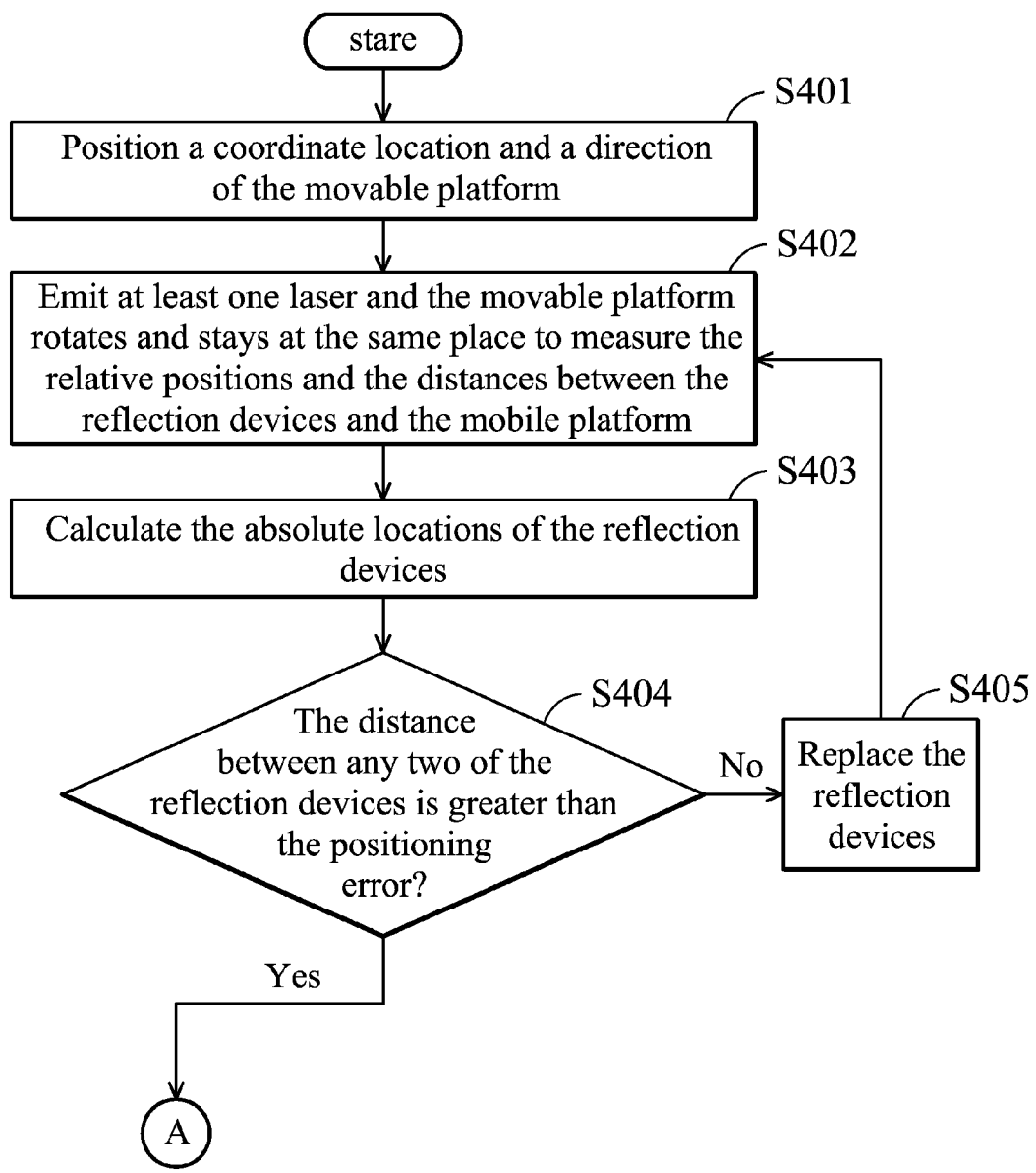
FIGS. 5A~5B are a flow diagram illustrating the method for navigation of the movable platform according to an embodiment of the present disclosure.
Figure 5B:
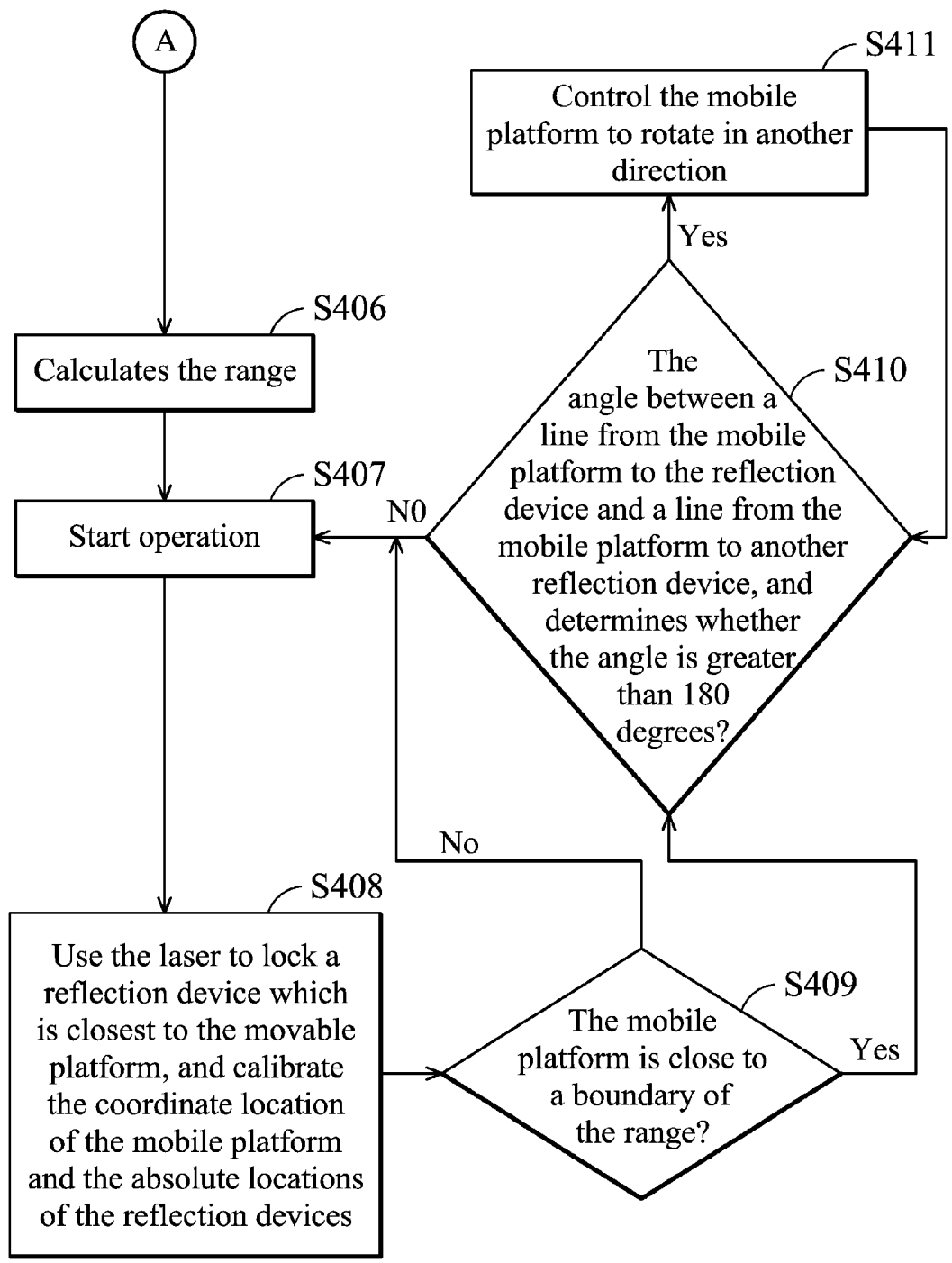

FIGS. 5A~5B are a flow diagram illustrating the method for navigation of the movable platform 110 according to an embodiment of the present disclosure.

Referring FIG. 1 to FIG. 4, first, the user places the plurality of reflection devices to mark a range, and puts the movable platform in the range. In step S401, the positioning system positions a current coordinate location and a current direction of the movable platform. In step S402, the laser range finder emits at least one laser and the movable platform rotates and stays at the same place to measure the relative positions and the distances between the reflection devices and the mobile platform. Then, in step S403, the processor calculates the absolute locations of the reflection devices according to the coordinate location and the direction of the movable platform positioned by the positioning system and the relative positions and the distances between the reflection devices and the mobile platform. In step S404, the processor determines whether the distance between any two of the reflection devices is greater than the positioning error. When the processor determines that the distance between any two of the reflection devices is smaller than or equal to the positioning error ("No" in step S404), in step S405, the processor sends a signal to inform the user to replace the reflection devices. When the processor determines that the distance between any two of the reflection devices is greater than the positioning error ("Yes" in step S404), in step S406, the processor calculates the range, such as an area surrounded by all the reflection devices. In step S407, the mobile platform starts operation in the range.

During the operation of the mobile platform, in step S408, the laser range finder uses the laser to lock a reflection device which is closest to the movable platform, and calibrates the coordinate location of the mobile platform and the absolute locations of the reflection devices. In step S409, the processor determines whether the mobile platform is close to a boundary of the range. When the mobile platform is close to the boundary of the range ("Yes" in the step S409), in step S410, the processor finds another reflection device which is closest to the movable platform except the reflection device to obtain an angle between a line from the mobile platform to the reflection device and a line from the mobile platform to another reflection device, and determines whether the angle is greater than 180 degrees. When the angle is greater than 180 degrees ("Yes" in step S410), in S411, the processor controls the mobile platform to rotate in another direction, and keeps detecting whether the angle is greater than 180 degrees. In another embodiment, when the angle is close to or reaches 180 degrees ("Yes" in step S410), in step S411, the processor controls the mobile platform to stop moving.

When the mobile platform is not close to the boundary of the range ("Yes" in the step S409) and the processor determines that the angle is smaller than or equal than 180 degrees ("Yes" in step S410), step S407 is performed and the mobile platform keeps working.

When the positioning system is the global positioning system (GPS), the positioning error of the receiver is about three to five meters, and the error of the laser range finder is smaller than 1 centimeter. This means that the error of the laser range finder is smaller than the positioning error of the positioning system. Therefore, the system for navigation of the mobile platform in the present disclosure can use the laser range finder installed on the top of the mobile platform and the positioning system to determine absolute locations, the latitudes and the longitudes of the reflection devices and the mobile platform, and further use the laser range finder to calibrate the relative positions of the mobile platform so that the positioning error can be reduced to achieve positioning accuracy within centimeters.

In addition, the number of reflection devices can be increased or decreased according to the range and the shape required. When there are obstacles in the range of operation, for example, houses, trees and other obstacles, the reflection devices can be arranged to mark the obstacles or the reflective films with specific reflective materials attached to the obstacles. When encountering an obstacle, the mobile platform moves along the edge of the obstacle until the mobile platform travels around the obstacle and goes back to the original path, and then the mobile platform continues operation. The absolute location of the obstacle can be stored and recorded by the mobile platform.

The technology of the present disclosure can be applied to a variety of outdoor mobile platforms, for example, outdoor service robots. The mobile platform in the disclosure can calculate the work location and the traveling direction exactly, and store and record the traveling path and the location of obstacles.

While the disclosure has been described by way of example and in terms of the preferred embodiments, it is to be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for navigation of a movable platform, used in a system; the system includes a plurality of reflection devices and a movable platform, wherein the movable platform further includes a positioning system, a laser range finder and a processor, the method comprising:

placing the plurality of reflection devices to mark a range;

receiving, by the positioning system, a coordinate location and a direction of the movable platform;

emitting, by the laser range finder, at least one laser to measure relative positions and distances respectively between the plurality of reflection devices and the movable platform;

calculating, by the processor, absolute locations of the plurality of reflection devices and the range according to the coordinate location and the direction of the movable platform, and the relative positions and the distances between the plurality of reflection devices and the movable platform; and scanning and tracking, by the laser range finder, the plurality of reflection devices, and calibrating, by the processor, the coordinate location and the direction of the movable platform and the absolute locations of the plurality of reflection devices to control the movable platform to move in the range;

wherein when the processor calibrates the coordinate location and the direction of the movable platform and the absolute locations of the plurality of reflection devices, the method further comprising:

locking, by using the laser, a first reflection device which is closest to the movable platform to calibrate the coordinate location of the mobile platform;

finding a second reflection device which is closest to the movable platform except the first reflection device when the mobile platform is close to a boundary of the range;

obtaining an angle between a line from the mobile platform to the first reflection device and a line from the mobile platform to the second reflection device; and controlling the mobile platform to move in another direction in the range when the angle reaches 180 degrees.

2. The method for navigation of a movable platform as claimed in claim 1, wherein the distance between any two of the plurality of reflection devices is greater than a positioning error of the positioning system.

3. The method for navigation of a movable platform as claimed in claim 1, wherein the positioning system is a global positioning system (GPS), a GLObal NAvigation Satellite System (GLONASS), a Galileo or a satellite based augmentation system (SBAS).

4. The method for navigation of a movable platform as claimed in claim 1, further comprising using a specific reflective material configured for attachment to the surface of the reflection devices, wherein the laser range finder can recognize the laser reflected from the specific reflecting material.

5. The method for navigation of a movable platform as claimed in claim 4, wherein a reflection rate of the specific reflective material is greater than 60%, and the specific reflective material can scatter the incident light.

6. The method for navigation of a movable platform as claimed in claim 5, wherein a receiving hole diameter of the laser range finder is between 0.5 mm and 15 mm.

7. A system for navigation of a movable platform, comprising:

a plurality of reflection devices, configured to mark a range; and a movable platform, configured to move in the range, comprising:

a positioning system, configured to position a coordinate location and a direction of the movable platform;

a laser range finder, configured to emit at least one laser to measure relative positions and distances respectively between the plurality of reflection devices and the movable platform; and a processor, coupled to the positioning system and the laser range finder, configured to calculate absolute locations of the plurality of reflection devices and the range according to the coordinate location and the direction of the movable platform, and the relative position and the distances between the plurality of reflection devices and the movable platform;

wherein the movable platform scans and tracks the plurality of reflection devices by using the laser range finder, and calibrates the coordinate location and the direction of the movable platform and the absolute locations of the plurality of reflection devices to control the movable platform to move in the range; and wherein when the processor calibrates the coordinate location and the direction of the movable platform and the absolute locations of the plurality of reflection devices, the laser range finder uses the laser to lock a first reflection device which is closest to the movable platform to calibrate the coordinate location of the mobile platform; and when the mobile platform is close to a boundary of the range, the laser range finder finds a second reflection device which is closest to the movable platform except the first reflection device; the processor obtains an angle between a line from the mobile platform to the first reflection device and a line from the mobile platform to the second reflection device, and when the angle reaches 180 degrees, the processor controls the mobile platform to move in another direction in the range.

8. The system for navigation of a movable platform as claimed in claim 7, wherein the distance between any two of the plurality of reflection devices is greater than a positioning error of the positioning system.

9. The system for navigation of a movable platform as claimed in claim 7, wherein the positioning system is a global positioning system (GPS), a GLObal NAvigation Satellite System (GLONASS), a Galileo or a satellite based augmentation system (SBAS).

10. The system for navigation of a movable platform as claimed in claim 7, wherein a specific reflective material is used for attachment to the surface of the reflection devices, so that the laser range finder can recognize the laser reflected by the specific reflecting material.

11. The system for navigation of a movable platform as claimed in claim 10, wherein a reflection rate of the specific reflective material is greater than 60%, and the specific reflective material can scatter the incident light.

12. The system for navigation of a movable platform as claimed in claim 11, wherein a receiving hole diameter of the laser range finder is between 0.5 mm and 15 mm.

* * * * *